United States Patent
Kim (10) Patent No.: US 7,134,033 B2
(45) Date of Patent: Nov. 7, 2006

(54) CLOCK SYNCHRONIZATION APPARATUS AND METHOD OF DEVICES WITH DIFFERENT CLOCKS

(75) Inventor: Young-Suck Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 10/619,501

(22) Filed: Jul. 16, 2003

(65) Prior Publication Data

US 2004/0034491 A1    Feb. 19, 2004

(30) Foreign Application Priority Data

Jul. 19, 2002    (KR) ............... 10-2002-0042556

(51) Int. Cl.
*G06F 1/12*    (2006.01)
(52) U.S. Cl. .............. 713/400; 713/501; 713/503
(58) Field of Classification Search ............ None
See application file for complete search history.

(56) References Cited

U.S. PATENT DOCUMENTS

| | | | | |
|---|---|---|---|---|
| 5,077,686 A | * | 12/1991 | Rubinstein | 713/501 |
| 5,923,195 A | * | 7/1999 | Graf, III | 327/144 |
| 6,314,049 B1 | | 11/2001 | Roohparvar | 365/233 |
| 6,813,721 B1 | * | 11/2004 | Tetreault et al. | 713/400 |
| 6,934,866 B1 | * | 8/2005 | Lin et al. | 713/401 |

FOREIGN PATENT DOCUMENTS

JP    09-198875    7/1997    ........ 11/413

OTHER PUBLICATIONS

Heinz Wrobel, Motorola GmbH, Munich and Janet Snyder, NCSD Applications, Austin. AN2066/D MPC8xx SDRAM Interface, Nov. 2001; pp. 1-6.

* cited by examiner

*Primary Examiner*—Thuan Du
(74) *Attorney, Agent, or Firm*—Fleshner & Kim, LLP (57) ABSTRACT

A clock-synchronizing apparatus and method of devices with different clocks are disclosed. Between a first device operated with a first clock and a second device operated with a second clock faster than the first clock, an operation latency of the second device refers to the first clock, control signals that controls the second device are generated at the second clock speed according to the operation latency, and an enable interval of the control signals has a ¼ clock period of the first clock. Accordingly, since the first device and the second device can transmit and receive a data to and from each other while being operated by using their own clock, an access latency for the first device to access the second device can be reduced and a transmission band width between the two devices can be effectively used.

27 Claims, 6 Drawing Sheets

| | | THE RELATED ART METHOD | | | 2:1 METHOD ACCORDING TO THE INVENTION | | | IMPROVEMENT OF PERFORMANCE | |
|---|---|---|---|---|---|---|---|---|---|
| | | SDRAM LATENCY | TOTAL LATENCY TO TRANSFER DATA | MAX BANDWIDTH | SDRAM LATENCY | TOTAL LATENCY TO TRANSFER | MAX BANDWIDTH | ACCESS TIME (2:1 METHOD/ THE RELATED ART METHOD) | MAX BANDWIDTH IMPROVEMENT (%) |
| CASE OF PAGE HIT | SINGLE READ | CL=2 | 2 | 4B/20ns= 200MB/s | CL=1 | 1 | 4B/10ns= 400MB/s | 1/2 | 100% |
| | BURST READ | CL=2 | 5 | 16B/50ns= 320MB/s | CL=1 | 4 | 16B/40ns= 400MB/s | 1/2 | 25% |
| CASE OF "NORMAL" PAGE MISS | SINGLE READ | RCD+ CL=4 | 4 | 4B/40ns= 100MB/s | RCD+ CL=2 | 2 | 4B/20ns= 200MB/s | 1/2 | 100% |
| | BURST READ | RCD+ CL=4 | 7 | 16B/70ns= 229MB/s | RCD+ CL=2 | 5 | 16B/50ns= 320MB/s | 1/2 | 40% |
| CASE OF PAGE MISS | SINGLE READ | RP+ RCD+ CL=6 | 6 | 4B/60ns= 67MB/s | RP+ RCD+ CL=3 | 3 | 4B/30ns= 133MB/s | 1/2 | 100% |
| | BURST READ | RP+ RCD+ CL=6 | 9 | 16B/90ns= 177MB/s | RP+ RCD+ CL=3 | 6 | 16B/60ns= 266MB/s | 1/2 | 50% |

CLOCK SYNCHRONIZATION APPARATUS AND METHOD OF DEVICES WITH DIFFERENT CLOCKS

BACKGROUND OF THE INVENTION

1. Field of the Invention

The present invention relates to a clock synchronization of devices with different clocks and, more particularly, to an apparatus and method for synchronizing two devices with different operation clocks (referred to as 'clock', hereinafter).

2. Background of the Related Art

In general, when a clock ratio between a RAM (e.g., an SDRAM (Synchronous Dynamic Random Access Memory)) and a memory controller of a microprocessor is a ratio of 2:1, a clock speed of the RAM is regulated to slow down to have the same speed as the clock speed of the microprocessor. This helps synchronize the clock ratio to 1:1 in spite of an interface between the synchronous devices.

If the clocks of each device to be interfaced do not agree with each other, the clock of a device with a fast clock speed must be lowered down to the level of the clock of a device with a slow clock speed for the purpose of interfacing. Therefore, the related art method for synchronizing the clock between two devices having a different clock has a problem that a maximum performance of the device with a fast clock speed is degraded as much as the clock speed is lowered.

SUMMARY OF THE INVENTION

One exemplary embodiment of the present invention is to provide a clock-synchronizing apparatus and method of devices with different clocks that are capable of minimizing performance degradation of a device with a fast clock speed in case of interfacing devices each with a different clock speed.

In another embodiment of the present invention, a clock-synchronizing apparatus and method of devices is provided with different clock that are capable of reducing an access latency that a device with a slow clock speed accesses a device with a fast clock speed, and capable of effectively using a transmission band width between two devices.

In another embodiment of the present invention, a clock-synchronizing apparatus of devices with different clocks includes: a first device operated according to a first clock and generating control signals at the speed of a second clock; a second device operated by being synchronized with the second clock according to the control signals and having an operation latency of one clock period of the first clock; and a clock driver for generating the second clock by multiplying the first clock by certain even times and removing a phase delay between the second clock and the first clock.

In another embodiment of the present invention, there is further provided a clock-synchronizing method of devices with different clocks including the steps of: programming a generation interval of RAM control signals so as to correspond to the operation latency of the RAM, for interfacing between a RAM with a speed of even times a clock speed of a microprocessor and the microprocessor; generating the RAM control signals corresponding to a specific operation mode at a RAM clock speed according to the programmed generation interval and outputting it from the microprocessor to the RAM; and performing an operation according to the operation mode between the microprocessor and the RAM on the basis of the microprocessor clock by the RAM control signals generated at the RAM clock speed while maintaining the programmed generation interval.

In another embodiment of the present invention, a clock-synchronizing apparatus of devices with different clocks includes a first device operated according to a first clock and generating control signals at a speed of a second clock; a second device operated by being synchronized with the second clock according to the control signals and having an operation latency of one clock period of the first clock; and a clock driver generating the second clock by multiplying the first clock by predetermined even times and removing a phase delay between the second clock and the first clock.

In another embodiment, a clock-synchronizing method of devices with different clocks includes programming a generation interval of memory control signals so as to correspond to an operation latency of a memory interfacing between a microprocessor and the memory which has a speed of predetermined even times a speed of a microprocessor clock; generating the memory control signals corresponding to a specific operation mode at a speed of a memory clock according to the programmed generation interval and outputting the memory control signals from the microprocessor to the memory; and performing an operation according to the operation mode between the microprocessor and the memory on the basis of the microprocessor clock by the memory control signals generated at the speed of the memory clock according to the programmed generation interval.

Additional advantages, and features of the invention will be set forth in part in the description which follows and in part will become apparent to those having ordinary skill in the art upon examination of the following or may be learned from practice of the invention. The advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
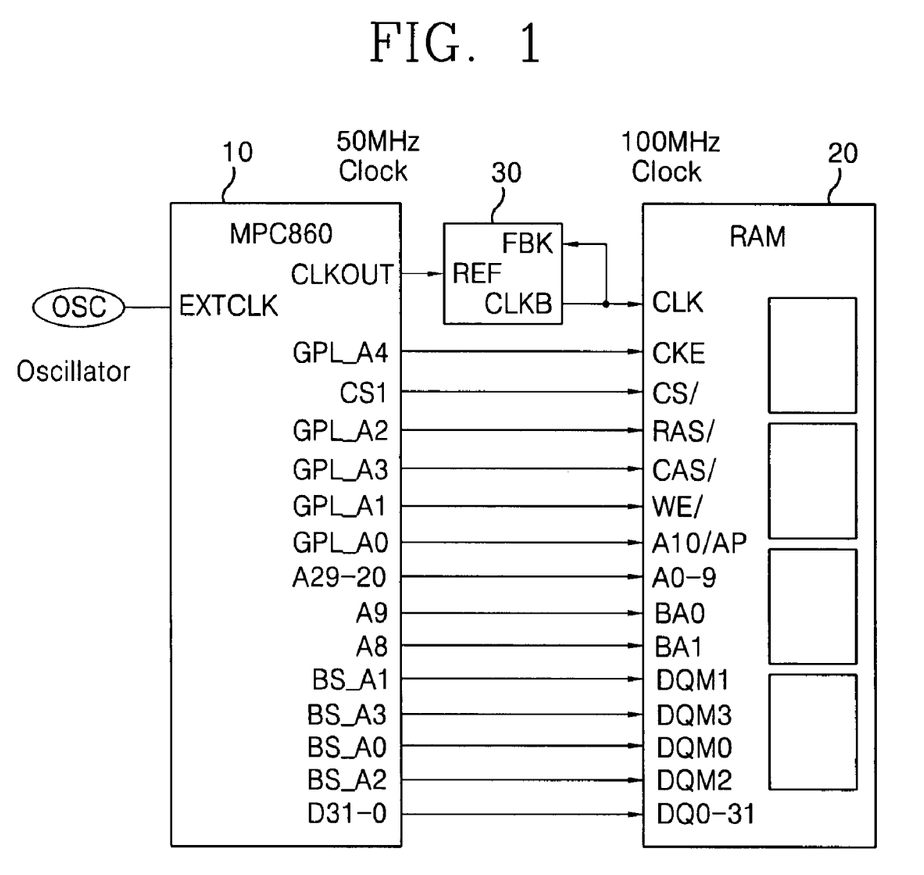
FIG. 1 illustrates an exemplary configuration of a clock-synchronizing apparatus of devices with different clocks in accordance with a preferred embodiment of the present invention.

FIG. 1 illustrates a configuration of a clock-synchronizing apparatus of devices with different clocks in accordance with a preferred embodiment of the present invention. FIG. 1 depicts a clock-synchronizing apparatus of devices having different clocks including: a microprocessor 10 operated according to a 50 MHz clock and generating a RAM control signal according to a double clock of 50 MHz; a clock driver 30 for doubling the 50 MHz clock to generate a 100 MHz clock and compensating for a phase difference due to a propagation delay between the 50 MHz clock and the 100 MHz clock; and a RAM 20 operated according to the 100 MHz clock and for using two clock periods of the 100 MHz clock as an operation latency. Here, the two clock periods of the 100 MHz clock represent two ticks of the 100 MHz clock.

The microprocessor 10 includes a memory controller (not shown in FIG. 1) where the RAM control signal generation method can be programmed by a user. The memory controller can be a UPM (user programmable machine). A CKE (clock enable) pin of the RAM 20 is generally used in a pull up state but, in one embodiment of the present invention, is connected to a GPL (general purpose line) port of the microprocessor 10. Accordingly, the RAM 20 has a clock suspension function of maintaining one more clock period of operation timing under the control of the microprocessor 10.

Figure 2:
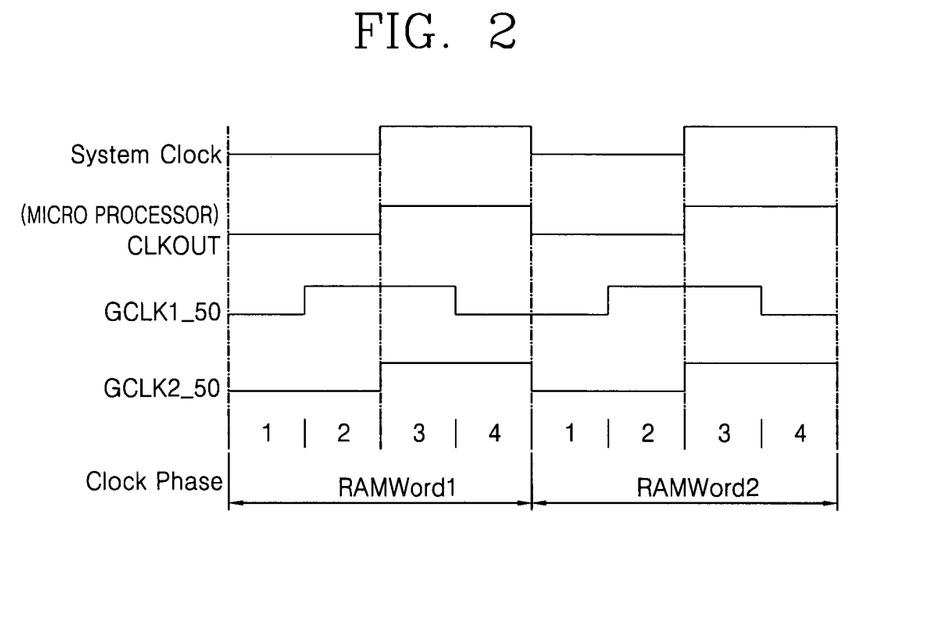
FIG. 2 illustrates an exemplary method of generating RAM control signals at a RAM clock speed by a microprocessor.

FIG. 2 shows a method of generating a RAM control signal according to double clock of 50 MHz, RAM clock, by the memory controller of the microprocessor 10. The microprocessor 10 obtains double clock of a 50 MHz clock by using a ¼ period shifted clock of a system clock (50 MHz clock) and the system clock, and generates a RAM control signal (RAM word) according to the obtained double clock of 50 MHz clock. Even if the microprocessor 10 is operated according to 50 MHz, the RAM control signal can be generated according to the 100 MHz clock by the memory controller of the microprocessor 10.

Figure 3:
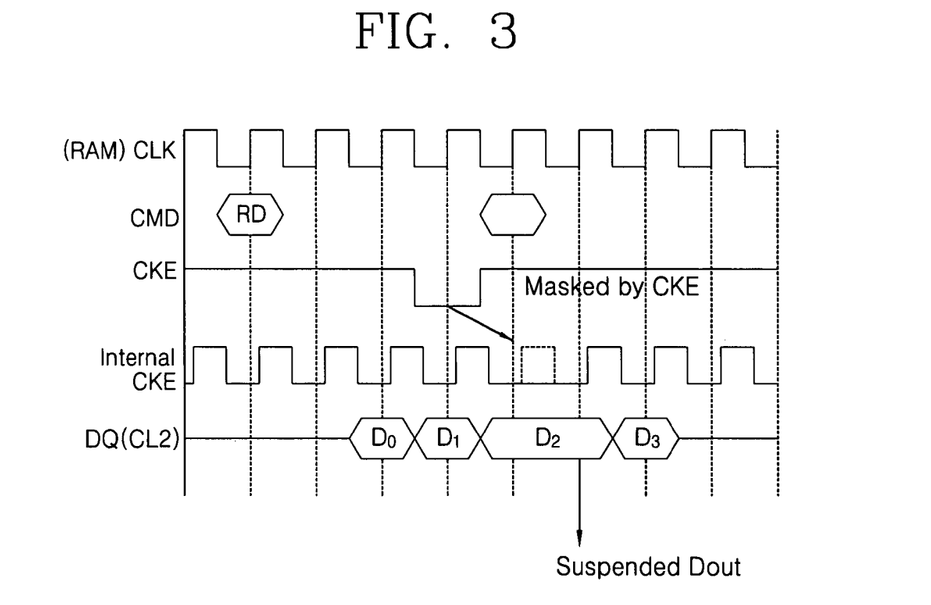
FIG. 3 illustrates an exemplary timing diagram explaining a read operation of the microprocessor according to a clock suspension function of a RAM.

FIG. 3 illustrates an exemplary timing diagram explaining a read operation of the microprocessor according to a clock suspension function of the RAM. The following embodiment of the present invention presents an exemplary case where one clock period of the clock of the microprocessor 10 corresponds to two clock periods of the clock of the RAM 20. If the RAM 20 maintains a data outputting for as long as one clock period, a first output data of the RAM 20 can be recognized by the microprocessor 10. However, in the case of a burst read, a second data recognized by the microprocessor 10 will correspond to the third data of the RAM 20, and at the point when the microprocessor 10 recognizes third and fourth data, since the RAM 20 shall have already outputted all the data, the microprocessor 10 would fail to recognize a data.

In addition, the RAM 20 expects a precharge after completing data outputting, whereas the microprocessor 10 expects a data recognition, so that the microprocessor 10 would lose the data stored in the RAM 20. In order to solve such problems, a clock suspension function of the RAM 20 is used.

When the microprocessor 10 outputs a clock enable signal (CKE) to the RAM 20, an internal CKE signal of the RAM 20 suspends for 1 clock according to the clock enable signal CKE, according to which the RAM maintains a data outputting by as long as one more clock. Therefore, the RAM 20 can output a data for every one clock period of the microprocessor 10 and the microprocessor 10 can read outputted data at every one clock period of the microprocessor 10. Therefore, the microprocessor 10 can read all the data outputted from the RAM 20 without a loss.

Figure 4:
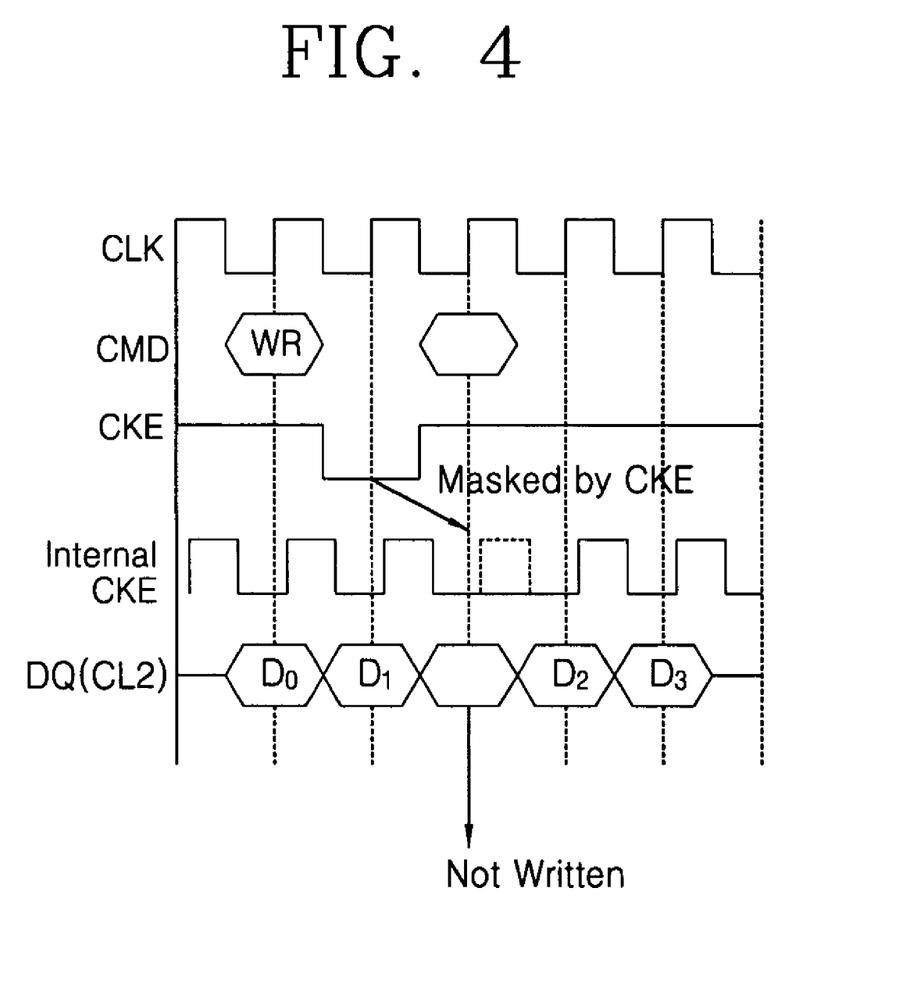
FIG. 4 illustrates an exemplary timing diagram explaining a write operation of the microprocessor according to a clock suspension function of a RAM.

FIG. 4 illustrates an exemplary timing diagram explaining a write operation of the microprocessor according to the clock suspension function of a RAM. In case that the microprocessor burst-writes to the RAM 20, even though the microprocessor 10 outputs a data at every clock, those data are not inputted to the RAM 20 at every clock. A clock suspension function of the RAM 20 is used to address this issue.

When the microprocessor 10 outputs a clock enable signal CKE to the RAM 20, an internal CKE signal of the RAM 20 suspends for one clock period according to the clock enable signal CKE, according to which the RAM 20 waits for data inputting for one clock period and then receives a data from the microprocessor 10 at a rising edge of the next clock period.

Therefore, even though the microprocessor 10 outputs data at every two clock periods of the RAM 20, the RAM 20 can receive the data from the microprocessor 10 at every two clock periods. The microprocessor 10 practically outputs a data to a 'don't care' region. But since the RAM 20 does not care about the 'don't care' region, it does not matter.

A clock-synchronizing method of devices with different clocks in accordance with another embodiment of the present invention will now be described. First, a generation interval of RAM control signals is programmed corresponding to an operation latency of the RAM 20 by a user. Next, in case of a specific operation mode between the microprocessor and the RAM, the microprocessor 10 outputs RAM control signals corresponding to the specific operation mode to the RAM 20 and the microprocessor 10 and the RAM 20 interwork in the specific operation mode on the basis of a microprocessor clock (50 MHz). Thus, the RAM 20 and the microprocessor 10 can perform the specific operation mode on the basis of the microprocessor clock even though they are operated by using their own clock.

Figure 5:
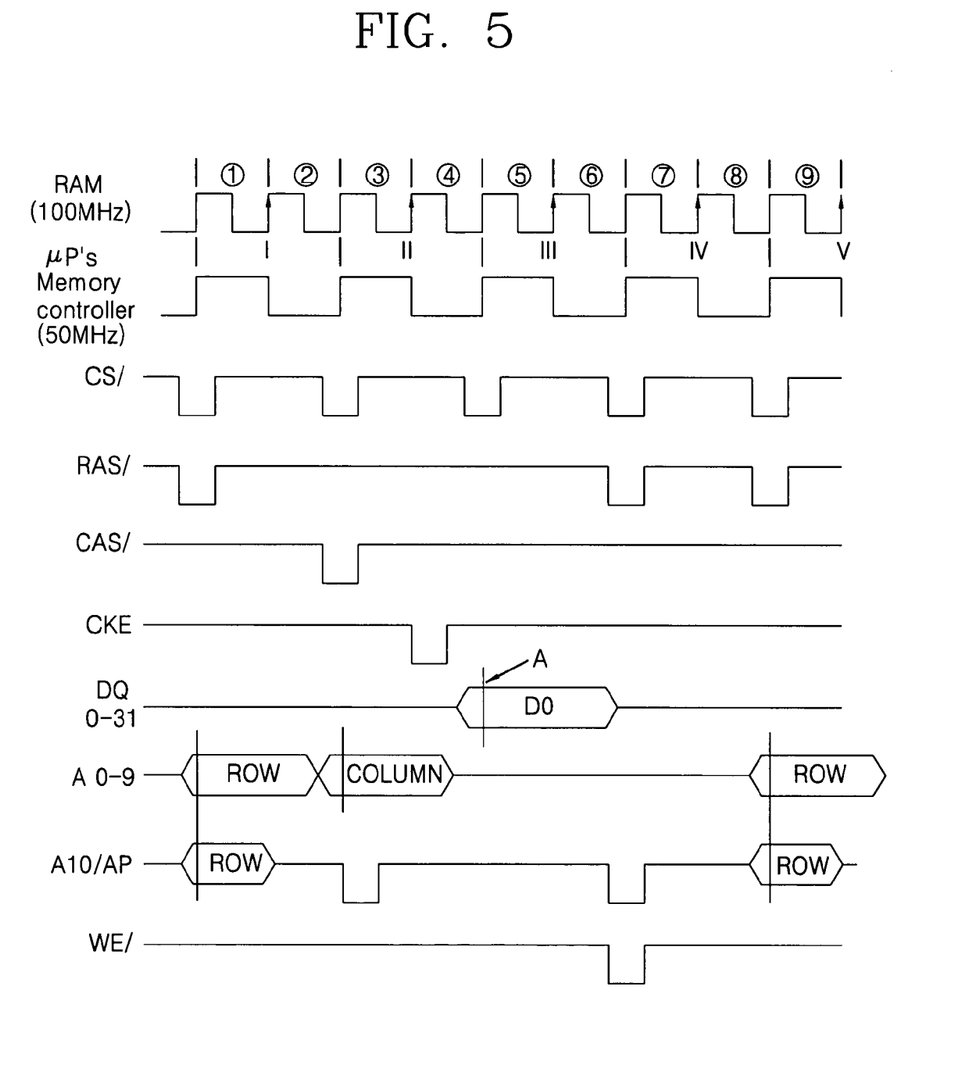
FIG. 5 illustrates an exemplary timing diagram showing a clock-synchronizing method for a read operation of the microprocessor in accordance with another embodiment of the present invention.

FIG. 5 illustrates an exemplary timing diagram showing a clock-synchronizing method for a read operation of the microprocessor in accordance with another embodiment of the present invention.

First, the user programs the memory controller so that a desired RAM control signal can be generated from the memory controller of the microprocessor 10, which will now be described.

In the case where the RAM 20 performs a data outputting operation, if the RAM 20 has two clock periods of the 100 MHz clock as an operation latency from the clock driver 30, an RCD (RAS to CAS Delay), a CL (CAS Latency) and an RP (Precharge time) of the RAM 20 are respectively two clock periods and equivalent to one clock period of the microprocessor 10.

The user programs RAM control signals as follows. The programming is done such that the RCD of the RAM 20 stored in a memory control table (UPM table) of the microprocessor 10 corresponds to one clock period of the microprocessor 10. The user programs a corresponding RAM control signal so that an RAS/ signal of the RAM 20 can be maintained in a low output state, that is, a state that the RAS/ signal is enabled only for a ¼ clock of the microprocessor 10.

The user programs a corresponding RAM control signal so that the CL of the RAM 20 stored in the memory control table of the microprocessor 10 corresponds to one clock period of the microprocessor 10 and programs a corresponding RAM control signal so that a CAS/ signal of the RAM

20 is maintained in a low output state, that is, the CAS/ signal is enabled only for a ¼ clock of the microprocessor 10.

In order to activate the clock suspension function to maintain the data outputting of the RAM for two clock periods (one clock period of the microprocessor 10), the user programs a corresponding RAM control signal so that the clock enable signal CKE is maintained in the low state for a ¼ clock period of the microprocessor 10.

The user programs so that when the clock enable signal CKE is enabled, the microprocessor 10 can read a data from the RAM 20 at a rising edge of the next clock. The user programs such that an RP of the RAM 20 existing in the memory control table of the microprocessor 10 corresponds to one clock period of the microprocessor 10 (which is equivalent to two clock periods of the RAM 20), so that when one data is drawn out from the RAM 20, the RAM 20 can be precharged.

The microprocessor 10 reads a data from the RAM 20 while a clock synchronization is being made between the microprocessor 10 and the RAM 20 will now be described. The memory controller of the microprocessor 10 simultaneously outputs RAM control signals to enable the CS/ signal (a signal for selecting a memory cell) and the RAS/ signal (a row address strobe signal). The CS/ signal and the RAS/ signal of the RAM 20 are simultaneously enabled by the RAM control signals.

At this time, the low state of the CS/ signal and the RAS/ signal, that is, the CS/ signal and the RAS/ signal are enabled, is maintained only for the ¼ clock of the microprocessor 10 ((1), (2)).

Since the RCD has been programmed to correspond to one clock period of the microprocessor 10, when one clock period of the microprocessor 10 elapses from a point that the RAS/ signal is enabled, the memory controller outputs a RAM control signal to enable the CAS/ signal (column address strobe signal).

The CAS/ signal of the RAM 20 is enabled by the outputted RAM control signal, and the enabled state of the CAS/ signal is maintained for the ¼ clock period of the microprocessor 10. At this time, the CL is equivalent to one clock period of the microprocessor 10.

When the CAS/ signal is enabled, the microprocessor 10 outputs a RAM control signal to enable the CKE signal and the CKE signal of the RAM 20 is enabled according to the RAM control signal (the CKE signal is maintained in the enabled state for the ¼ clock period of the microprocessor 10).

While the data (D0) output of the RAM 20 is maintained for the two clock periods of the RAM 20 according to the enabled CKE signal, the microprocessor 10 samples a data D0 at a rising edge (point 'A') of the next clock (the next clock of the microprocessor 10) ((5), (6)).

When one data D0) is outputted, a RAM control signal for precharge of the RAM 20 is outputted from the microprocessor 10, and at this time, the RP of the RAM 20 is given as long as one clock period of the microprocessor 10 ((7), (8)). When one read period is finished in this manner, a new read period starts (9), of which operations are the same as described above.

Figure 6:
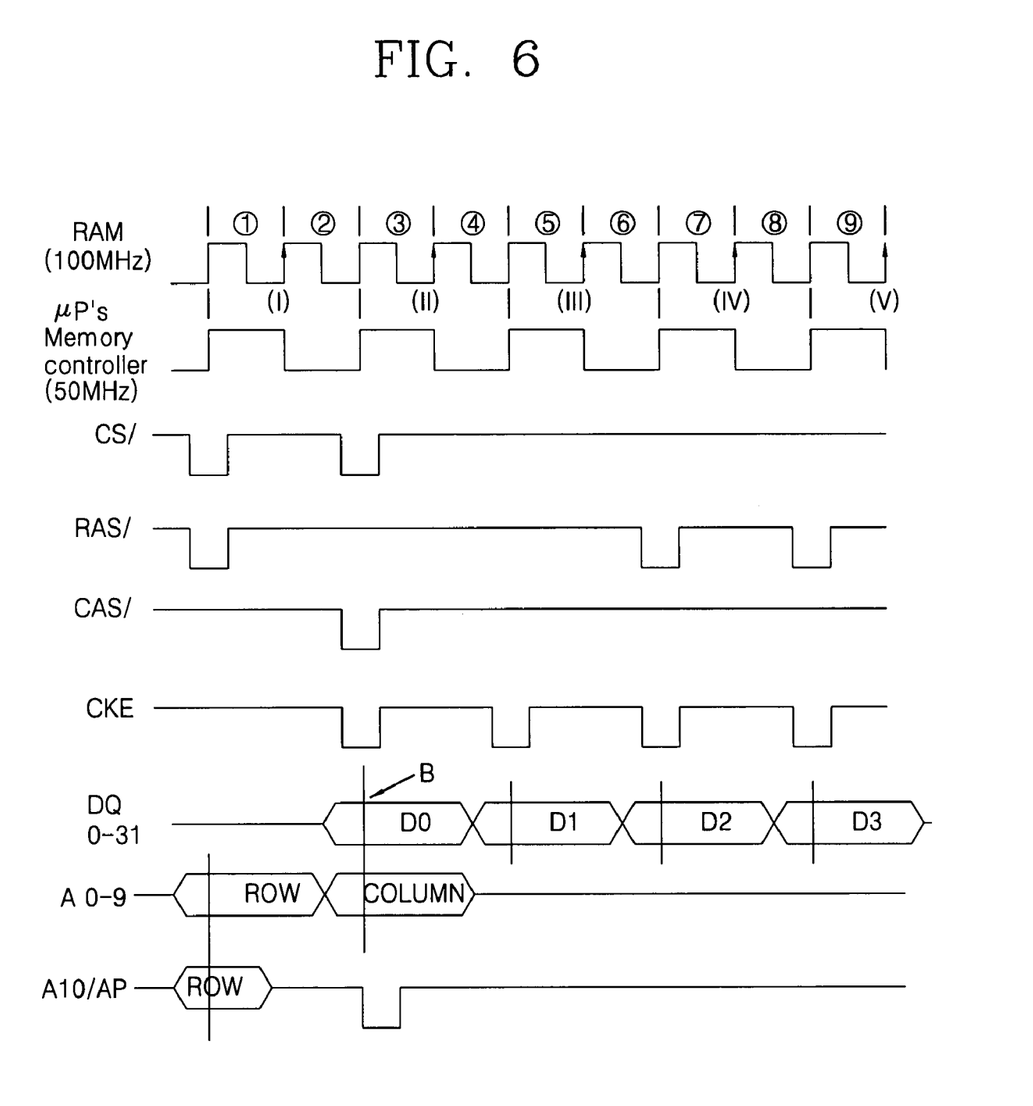
FIG. 6 illustrates an exemplary timing diagram showing a clock-synchronizing method for a burst write operation of the microprocessor in accordance with still another embodiment of the present invention.

FIG. 6 illustrates an exemplary timing diagram showing a clock-synchronizing method for a burst write operation of the microprocessor in accordance with still another embodiment of the present invention.

If the RAM 20 has two clock periods of 100 MHz (the operation clock of the microprocessor 10) as an operation latency in operation of a data outputting, an RCD (RAS to CAS Delay), a CL (CAS Latency) and an RP (Precharge time) of the RAM 20 are respectively two clock periods of 50 MHz of the RAM 20 which corresponds to one clock period of the operation clock of the microprocessor 10.

The user programs RAM control signals in the following manner. That is, the user programs corresponding control signals so that RCD, CL and RP of the RAM 20 stored in the memory control table (UPM table) of the microprocessor 10 corresponds to one clock period of the microprocessor 10.

In addition, an RAS/ signal enabled during the RCD interval is programmed to be in an enabled state only for a ¼ clock of the microprocessor 10. A CAS/ signal and a CKE signal enabled during the CL interval are programmed to be maintained in the enabled state only for the ¼ clock of the microprocessor 10.

The CKE signal is programmed by the user such that it is enabled at a rising edge of each clock of the microprocessor 10 until one period of the burst write is completed, and the enabled state is maintained only for the ¼ clock of the microprocessor 10.

An operation that the microprocessor 10 burst-writes a data to the RAM 20 while a clock synchronization is being made between the microprocessor 10 and the RAM 20 will now be described.

The memory controller of the microprocessor 10 simultaneously outputs RAM control signals to enable the CS/ signal and the RAS/ signal. As the CS/ signal and the RAS/ signal of the RAM 20 are simultaneously enabled by the RAM control signals, the RAM 20 samples a row address. At this time, the enabled state (that is, a low state) of the CS/ signal and the RAS/ signal are maintained only for a ¼ clock of the microprocessor 10 ((1), (2)).

Since the RCD has been programmed to correspond to one clock period of the microprocessor 10, when one clock period of the microprocessor 10 elapses from a point when the RAS/ signal is enabled, the memory controller simultaneously outputs a RAM control signal to enable the CAS/ signal and a RAM control signal to enable the CKE signal.

When the CAS/ signal and the CKE signal of the RAM 20 are enabled by the simultaneously outputted RAM control signals (the enabled state of the CAS/ signal and the enabled state of the CKE signal0 are maintained for the ¼ clock period of the microprocessor 10), the RAM 20 samples a column address at a point 'B' and at the same time samples a data (D0) from the microprocessor 10 and writes it in a corresponding region ((3), (4)).

The RAM 20 performs a data sampling at a current clock (the point 'B') by the enabled CKE signal and does not perform a data sampling in the next clock. Thus, the RAM 20 reads a data for two clock periods of the RAM (for one clock period of the microprocessor). The microprocessor 10 enables the CKE signal of the RAM 20 at the rising edge of each clock of the microprocessor 10 until one period of the burst write is completed. As a matter of course, the low state of the enabled CKE signal is maintained for the ¼ clock of the microprocessor 10. Since the CKE signal is enabled for each clock of the microprocessor 10 for one period of the burst write, the RAM 20 samples data (D1–D3) at the rising edge of each clock of the microprocessor 10 according to the clock suspension function ((5)–(9)).

When one period of the burst write is completed, the RAM 20 is precharged (not shown in FIG. 6). At this time, the CL can be one clock period of the microprocessor 10. In this manner, the microprocessor 10 can generate a RAM control signal at a doubled clock speed of the operation clock of the microprocessor 10, each of the reading and writing timing of the RAM 20 can be delayed by one clock period of the RAM 20, and the RAM 20 has the same operation latency as one clock period of the microprocessor 10. Therefore, the microprocessor 10 and the RAM 20 each having a different clock can be mutually interfaced while using their own clock as it is.

Figure 7:
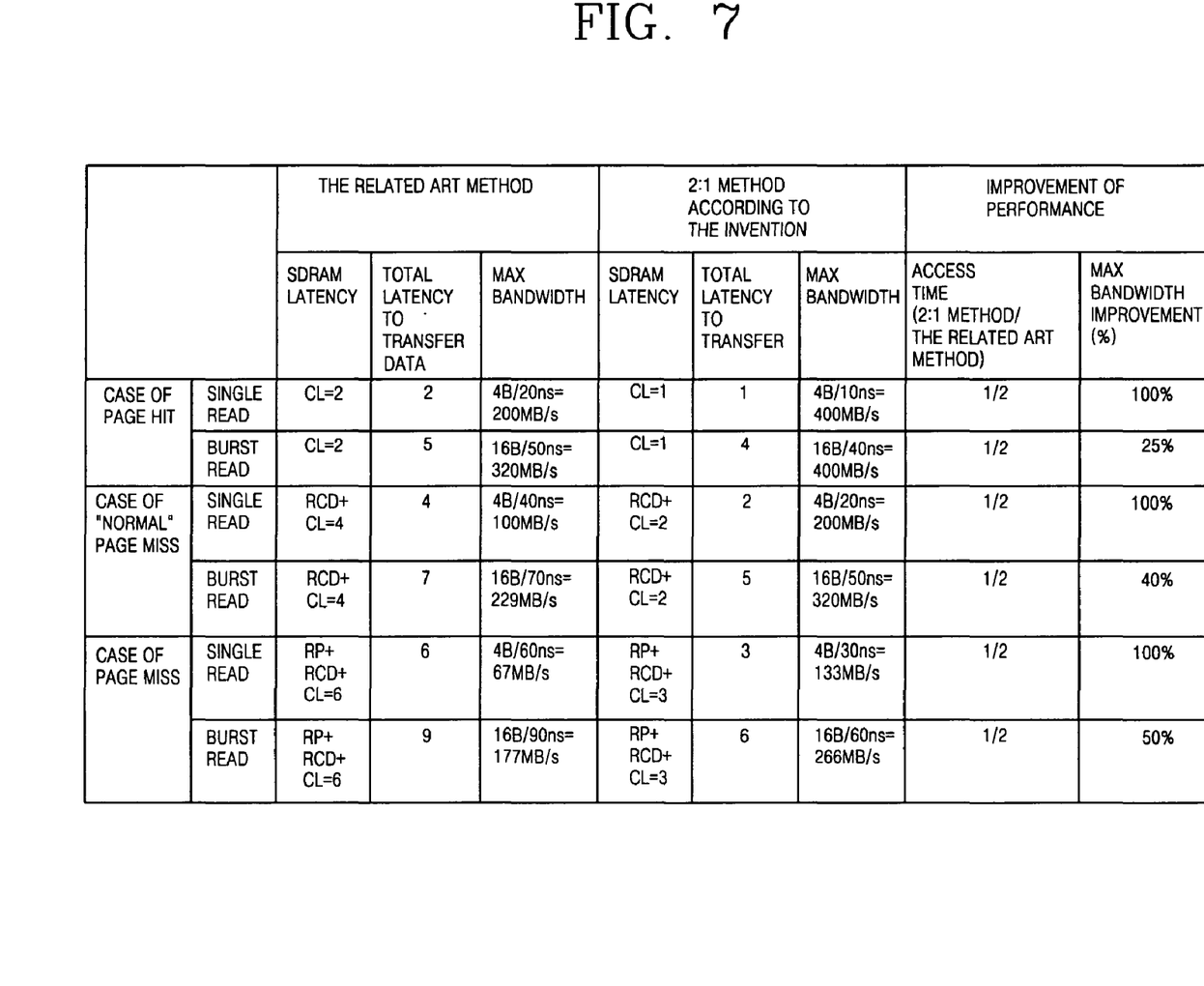
FIG. 7 is a table showing comparison results between a performance of the related art interfacing method and that of an interfacing method of one embodiment of the present invention.

FIG. 7 is a table showing comparison results between a performance of a related art interfacing method and that of an interfacing method in accordance with one embodiment of the present invention. It is noted from FIG. 7 that the interfacing method of the present invention has an improved performance from a minimum 25% to a maximum 100% compared to the interfacing method of the related art.

The present invention is adoptable to interfacing for a mode register set for setting a mode of a RAM, for a refresh command for refreshing the RAM, or the like, as well as the interfacing for reading/writing of data between the microprocessor and the RAM.

As so far described, the clock-synchronizing apparatus and method of devices with a different clock of the present invention has the following advantages. That is, since devices with a different clock speed can interface with each other by using their own clock as it is, it is not necessary to lower a clock of a device with a fast clock speed down to be the same as a slow clock of the opposite clock, a performance degradation of the device with the fast clock speed can be minimized.

In addition, since the device with the fast clock speed can interface by using its own clock as it is, an access latency that a device with a slow clock speed accesses a device with the fast clock speed can be reduced and a transmission band with between the two devices can be effectively used.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A clock-synchronizing apparatus of devices with different clocks comprising:
    a first device operated according to a first clock and generating control signals at a speed of a second clock;
    a second device operated by being synchronized with the second clock according to the control signals and having an operation latency of one clock period of the first clock; and
    a clock driver generating the second clock by multiplying the first clock by predetermined even times and removing a phase delay between the second clock and the first clock.

2. The apparatus of claim 1, wherein the predetermined even times includes double and a clock ratio of the first clock and second clock comprises 1:2.

3. The apparatus of claim 2, wherein the first device can generate control signals at the speed of the second clock by using the first clock and a clock shifted as long as a clock period of the first clock.

4. The apparatus of claim 1, wherein the second device delays an operation timing by one clock period according to a control signal for performing a clock suspension function among the control signals.

5. The apparatus of claim 1, wherein the first device comprises a microprocessor, the second device comprises a Random Access Memory (RAM), and the predetermined even times comprises double.

6. The apparatus of claim 5, wherein the microprocessor includes a memory controller of which a RAM control signal generation method can be programmed by a user, and wherein the memory controller can generate the control signals at the speed of the second clock.

7. The apparatus of claim 6, wherein the RAM delays its operation timing by one clock period according to a control signal performing the clock suspension function among the generated control signals.

8. The apparatus of claim 7, wherein an enable period of the control signal performing the clock suspension function has a ¼ clock period of the first clock.

9. A clock-synchronizing method of devices with different clocks comprising:
    programming a generation interval of Random Access Memory (RAM) control signals so as to correspond to an operation latency of a RAM that interfaces with a microprocessor, the RAM having a speed of predetermined even times a speed of a microprocessor clock;
    generating the RAM control signals corresponding to a specific operation mode at a speed of a RAM clock according to the programmed generation interval and outputting the RAM control signals from the microprocessor to the RAM; and
    performing an operation, by the generated RAM control signals, between the microprocessor and the RAM according to the specific operation mode on the basis of the microprocessor clock.

10. The method of claim 9, wherein a ratio of the microprocessor clock and the RAM clock comprises 1:2.

11. The method of claim 9, wherein the operation latency of the RAM is equal to one clock period of the microprocessor clock.

12. The method of claim 9, wherein an enable period of the generated RAM control signals is equal to a ¼ clock period of the microprocessor clock.

13. The method of claim 9, wherein the specific operation mode comprises: a mode reading a data from the RAM by the microprocessor; a mode writing a data to the RAM by the microprocessor; a mode refreshing the RAM; and a mode setting a mode of the RAM.

14. The method of claim 9 further comprising:
    programming an RCD (RAS to CAS Delay) of the RAM as one clock period of the microprocessor clock, if the specific operation mode is the read mode of the microprocessor;
    programming a CL (CAS Latency) of the RAM as one clock period of the microprocessor clock;
    programming an enable period of the RAM control signal to perform the clock suspension function as a ¼ clock period of the microprocessor clock; and
    programming an RP (precharge time) to precharge the RAM as one clock period of the microprocessor clock.

15. The method of claim 14 further comprising: outputting data during two clock periods of the RAM clock from the RAM, when the RAM control signal performing the clock suspension function is enabled.

16. The method of claim 9 further comprising if the specific operation mode is a burst write mode of the microprocessor:
    an operation in which the RCD of the RAM is programmed as one clock period of the microprocessor clock;

an operation in which the CL of the RAM is programmed as one clock period of the microprocessor clock;

an operation in which an enable period of the RAM control signal for performing the clock suspension function is programmed to be a ¼ clock period of the microprocessor;

an operation in which the RAM control signal is programmed to be enabled at each microprocessor clock until one period of a burst write is finished; and an operation in which the RP that precharges the RAM is programmed to be one clock period of the microprocessor.

17. The method of claim 16, wherein when the RAM control signal is enabled, the data input operation of the RAM is delayed by each one clock period of the RAM clock.

18. A clock-synchronizing method of devices with different clocks comprising:

programming memory control signals so as to correspond to an operation latency of a memory interfacing with a microprocessor, the memory having a speed of predetermined even times a speed of a microprocessor clock;

generating the memory control signals corresponding to a specific operation mode at a speed of a memory clock according to the programmed memory control signals and outputting the memory control signals from the microprocessor to the memory; and performing an operation, by the generated memory control signals, between the microprocessor and the memory according to the operation mode on the basis of the microprocessor clock.

19. The method of claim 18, wherein a ratio of the microprocessor clock and the memory clock comprises 1:2.

20. The method of claim 18, wherein the operation latency of the memory is equal to one clock period of the microprocessor clock.

21. The method of claim 18, wherein an enable period of the generated memory control signals equals to a ¼ clock period of the microprocessor clock.

22. A clock-synchronizing method of devices with different clocks comprising:

performing a read operation of a microprocessor according to a clock suspension function of a Random Access Memory (RAM);

outputting a clock enable signal from the microprocessor according to a clock suspension function of the RAM; and using an internal clock signal of the RAM and suspending RAM operation for at least one clock according to the clock enable signal and wherein the RAM maintains a data outputting by as long as one more clock period.

23. The method of claim 22 further comprising: the RAM outputting data for every one clock period of the microprocessor and the microprocessor reading the outputted data at every one clock period of the microprocessor.

24. The method of claim 22 further comprising: during a microprocessor write operation to the RAM, a clock suspension function being applied wherein the microprocessor outputs a clock enable signal to the RAM and the RAM waits for data inputting for at least one clock period and receives data at a rising edge of the next clock period.

25. A clock-synchronizing method of devices with different clocks comprising:

outputting a clock enable signal from a microprocessor to a Random Access Memory (RAM); and suspending an internal clock signal of the RAM for at least one clock period according to the clock enable signal, wherein the RAM waits for data inputting for at least one clock period and receives a data from the microprocessor at a rising edge of the next clock period.

26. The method of claim 25, wherein the microprocessor outputs data at every two clock periods of the RAM and the RAM can receive the data from the microprocessor at every two clock periods.

27. The method of claim 25, wherein RAM signal information is stored in a memory control table of the microprocessor and at least one signal of the signal information corresponds to one clock period of the microprocessors, the at least one signal of the signal information being enabled for a ¼ clock period of the microprocessor.

* * * * *